US 8,874,443 B2

(12) United States Patent
Weng et al.

(10) Patent No.: US 8,874,443 B2
(45) Date of Patent: Oct. 28, 2014

(54) SYSTEM AND METHOD FOR GENERATING NATURAL LANGUAGE PHRASES FROM USER UTTERANCES IN DIALOG SYSTEMS

(75) Inventors: Fuliang Weng, Mountain View, CA (US); Laura Stoia, Columbus, OH (US); Junling Hu, Menlo Park, CA (US); Zhe Feng, Shanghai (CN); Junkuo Cao, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 1284 days.

(21) Appl. No.: 12/199,520

(22) Filed: Aug. 27, 2008

(65) Prior Publication Data

US 2010/0057463 A1    Mar. 4, 2010

(51) Int. Cl.
G10L 15/00 (2013.01)
G10L 15/18 (2013.01)
G06F 17/27 (2006.01)
G10L 13/00 (2006.01)
G10L 13/08 (2013.01)
G10L 21/00 (2013.01)
G10L 25/00 (2013.01)
G10L 21/06 (2013.01)
G10L 15/22 (2006.01)
G06F 17/28 (2006.01)

(52) U.S. Cl.
CPC .............. *G10L 15/22* (2013.01); *G06F 17/27* (2013.01); *G06F 17/28* (2013.01)
USPC .............. 704/257; 704/9; 704/258; 704/260; 704/275; 704/276

(58) Field of Classification Search
USPC ........................................................ 704/257
See application file for complete search history.

(56) References Cited

U.S. PATENT DOCUMENTS

| 6,246,981 B1* | 6/2001 | Papineni et al. ............... 704/235 |
| 6,721,706 B1* | 4/2004 | Strubbe et al. ................ 704/275 |
| 7,606,714 B2* | 10/2009 | Williams et al. .............. 704/275 |
| 7,925,507 B2* | 4/2011 | Weng et al. .................... 704/257 |
| 8,083,675 B2* | 12/2011 | Robinson et al. ............. 600/300 |

(Continued)

FOREIGN PATENT DOCUMENTS

| EP | 1 349 145 A | 10/2003 |
| JP | 2006 031467 A | 2/2006 |

OTHER PUBLICATIONS

Weng, F., et al, CHAT: A Conversational Helper for Automotive Tasks. Proc. Interspeech, Pittsburgh, PA, USA, Sep. 2006.*

(Continued)

*Primary Examiner* — Richemond Dorvil
*Assistant Examiner* — Olujimi Adesanya
(74) *Attorney, Agent, or Firm* — Dergosits & Noah LLP

(57) ABSTRACT

Embodiments of a dialog system that employs a corpus-based approach to generate responses based on a given number of semantic constraint-value pairs are described. The system makes full use of the data from the user input to produce dialog system responses in combination with a template generator. The system primarily utilizes constraint values in order to realize efficiencies based on the more frequent tasks performed in real dialog systems although rhetorical or discourse aspects of the dialog could also be included in a similar way, that is, labeling the data with such information and performing a training process. The benefits of this system include higher quality user-aligned responses, broader coverage, faster response time, and shorter development cycles.

22 Claims, 5 Drawing Sheets

(56) References Cited

U.S. PATENT DOCUMENTS

| | | | |
|---|---|---|---|
| 2002/0005865 A1* | 1/2002 | Hayes-Roth | 345/706 |
| 2002/0133347 A1* | 9/2002 | Schoneburg et al. | 704/257 |
| 2005/0049852 A1* | 3/2005 | Chao | 704/9 |
| 2005/0154580 A1* | 7/2005 | Horowitz et al. | 704/9 |
| 2006/0009973 A1* | 1/2006 | Nguyen et al. | 704/257 |
| 2006/0041378 A1* | 2/2006 | Cheng et al. | 701/211 |
| 2006/0089928 A1* | 4/2006 | Johnson | 707/4 |
| 2007/0078815 A1* | 4/2007 | Weng et al. | 707/2 |
| 2007/0100624 A1* | 5/2007 | Weng et al. | 704/257 |

OTHER PUBLICATIONS

Callaway et al, 2002. Pronominalization in generated discourse and dialogue. In Proceedings of the 40th Annual Meeting of the Association for Computational Linguistics (ACL), pp. 1-8, Philadelphia.*

Cavedon et al, "Developing a Conversational In-Car Dialog System", The 12th International Congress on Intelligent Transportation Systems, San Francisco CA, USA, 2004, pp. 1-11.*

Lemon et al, "Collaborative activities and multitasking in dialogue systems", 2002, In Traitement Automatique des Langues, 43(2): pp. 131-154.*

Larsson et al, "Information state and dialogue management in the TRINDI dialogue move engine toolkit", 2000, Natural Language Engineering 5 (3-4), pp. 323-340.*

Form PCT/ISA/220, "PCT Notification of Transmittal of the International Search Report and the Written Opinion of the International Searching Authority, or the Declaration," 1 pg.

Form PCT/ISA/210, "PCT International Search Report," 4 pgs.

Form PCT/ISA/237, "PCT Written Opinion of the International Searching Authority," 6 pgs.

Cheongjae Lee et al: "A Situation-Based Dialogue Management Using Dialogue Examples" Acoustics, Speech and Signal Processing, 2006. ICASSP 2006 Proceedings. 2006 IEEE International Conference on Toulouse, France May 14-19, 2006, Piscataway, NJ, USA, IEEE, Piscataway, NJ, USA, vol. 1, May 14, 2006, pp. 1-69, XP010930118.

Zhiyong Wu et al: "A Corpus-Based Approach for Cooperative Response Generation in a Dialog System" Chinese Spoken Language Processing Lecture Notes in Computer Science; Lecture Notes in Artificial Intellig Ence; Lncs, Springer, Berlin, DE, vol. 4274, Jan. 1, 2006, pp. 614-625, XP019051686.

Murao H et al: "Example-based query generation for spontaneous speech" Automatic Speech Recognition and Understanding, 2001. ASRU '01. IEEE Workshop on Dec. 9-13, 2001, Piscataway, NJ, USA, IEEE, Dec. 9, 2001, pp. 268-271, XP010603728.

Chinese Patent Application First Office Action for Chinese Patent Application No. 200980137642.3 (English translation and Chinese language original).

"A Corpus-Based Approach for Cooperative Response Generation in a Dialog System," Wu, Zhiyong, et al., Department of Systems Engineering and Engineering Management, The Chinese University of Hong Kong, Shatin, pp. 1-13.

* cited by examiner

SYSTEM AND METHOD FOR GENERATING NATURAL LANGUAGE PHRASES FROM USER UTTERANCES IN DIALOG SYSTEMS

FIELD

Embodiments of the invention relate generally to dialog systems, and more specifically to generating phrases for system response in dialog systems.

BACKGROUND

A dialog system is a computer system that is designed to converse with a human using a coherent structure and text, speech, graphics, or other modes of communication on both the input and output channel. Dialog systems that employ speech are referred to as spoken dialog systems and generally represent the most natural type of machine-man interface. With the ever-greater reliance on electronic devices, spoken dialog systems are increasingly being implemented in many different machines.

Response generation is an important component in developing a conversational dialog system. End users often judge the quality of a dialog system based on the quality of the responses they hear from the system. This relates to the Gricean cooperative principle, which describes how people interact with one another and posits that conversational contributions are made as required, at the appropriate time, and for the purpose of advancing the conversation. One aspect of system quality is the avoidance of obscure or non-responsive expressions, and preferably the use of phrases with which the user is familiar. Increased attention has been paid by system developers and researcher with regard to response generation issues involving not just response generation content, but also content presentation.

Response generation systems use trained models to generate appropriate responses to user input. The quality of such trained models relies on a corpus of training data. Known training systems generally use data collected from one or more real people. Typically, these systems do not use data from the actual user themselves. Therefore, such training data is not necessarily suited to the actual user, and will likely not generate responses that are always or even mostly familiar to the user.

One hybrid approach presently known in the art employs case-based reasoning with rule adaptation. It uses an annotated corpus as its knowledge sources and grammar rules for new sentence construction. In the corpus, each sentence is associated with a semantic representation called SemGraphs and a realization tree called ReaTree. The SemGraph describes semantic relations among the entities in the sentence it is associated with. The ReaTree corresponds to the syntactic lexical representation of the associated sentence, which serves as the base for sentence realization. Text generation goes through the three phases of retrieval, in which, given a SemGraph by a content planner, retrieve sentences with similar SemGraphs from the annotated corpus; adaptation in which one or more adaptation operators are applied to the corresponding ReaTrees for necessary adjustment to the current input SemGraph; and linearization, in which the adapted ReaTree is sent to a linearization module to produce a sentence that meets all the grammatical agreement requirements. In addition, a learning phase is invoked after sentences are generated, where the SemGraph, its corresponding adapted ReaTree, and the generated sentences are first stored in a temporary case repository and then manually verified before getting incorporated into the main corpus for reuse.

This approach does not address directly the use of the sentences from the user side for a system response. Furthermore, during the retrieval step, only propositions are adjusted using substitution, deletion and insertion for computing similarity. No operation is done on the speech act aspects. Therefore, similarity between a SemGraph for user and a SemGraph for the system responses is usually very low.

Other approaches may offer improved alignment between user and system responses, but such systems, such as those that compute the distance between the system response candidates and its corresponding user utterance using a bag-of-words or a bag-of-bigrams approach over-generate system response candidates by a rule-based production system and hand-written rules. Such systems do not directly and automatically identify the constraint-carrying phrases from the user utterances, which offer better alignment and more natural wording.

Other known systems provide a statistical approach for generation using packed forests to structurally represent many instances. In such systems, a statistical language model is used to rank alternatives given a semantic input. However, these approaches do not address the alignment issue. In general, all present approaches, including those that try to model the user data directly, do not adequately address the issue of disparity between user utterances and system responses.

What is needed, therefore, is a dialog system response generator that effectively utilizes actual user input in order to generate responses that are most meaningful to the user.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments of a dialog system that employ a corpus-based approach to generate responses based on a given number of semantic constraint-value pairs are described. In addition to any available data from sources such as WOZ data collection, the system makes full use of the data from the user input to produce dialog system responses in combination with a template generator. The system primarily utilizes expressions that contain constraint values in order to realize efficiencies based on the more frequent tasks performed in real dialog systems, although expressions with rhetorical or discourse aspects of the dialog can also be considered in a similar way, that is, labeling the data with such information and performing a training process. The benefits of this system include higher quality user-aligned responses, broader coverage, faster response time, and shorter development cycles.

In the following description, numerous specific details are introduced to provide a thorough understanding of, and enabling description for, embodiments of the dialog system response generation system and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

In typical human-machine dialog systems, utterances from the users and the responses from the system are often different from one another. In general, however, certain phrases from the user and the system could be shared, especially phrases that express constraints for application-specific dialog systems. Embodiments are directed to a dialog system response generator that extracts phrases and phrase patterns from user utterances, generates new patterns based on the extractions, composes response expressions, and selects the best expression candidate based on one or more evaluation metrics.

Figure 1:
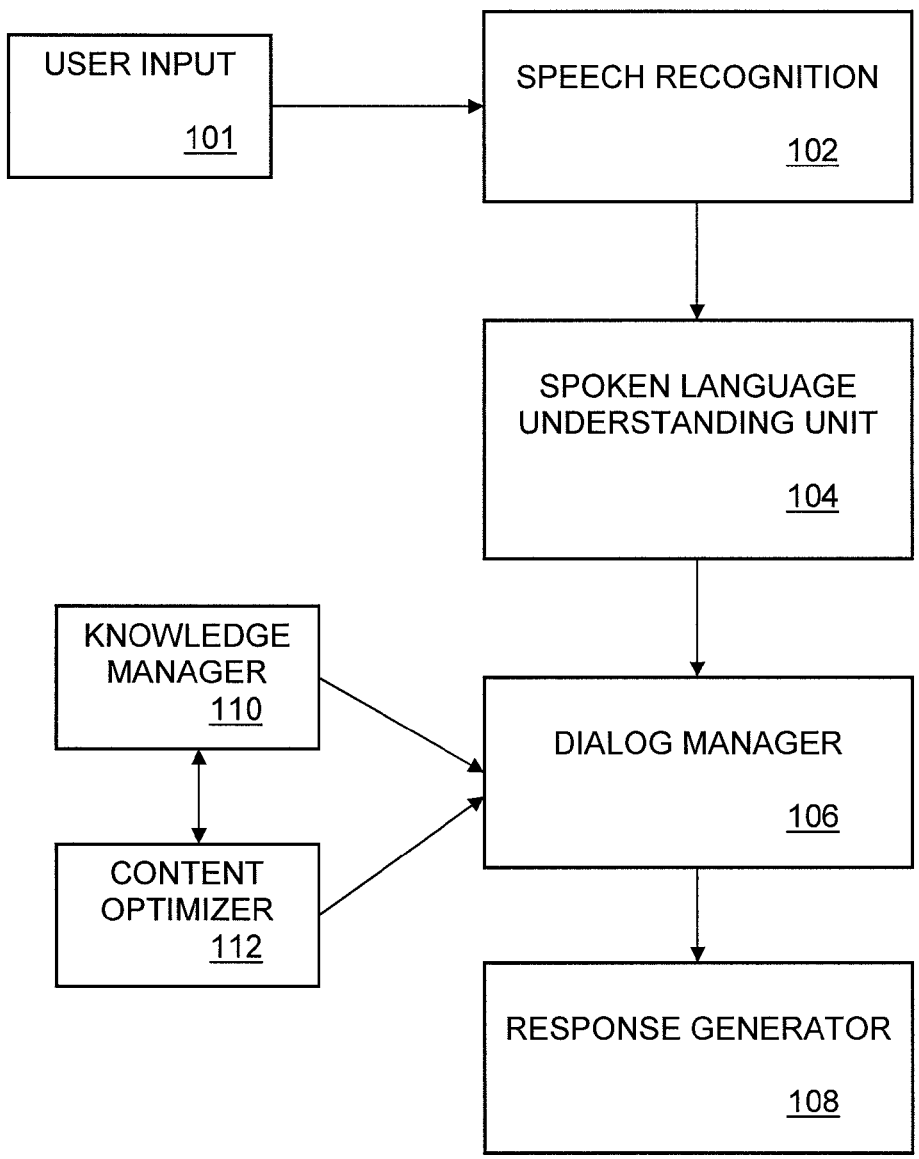
FIG. 1 is a block diagram of a spoken dialog system that incorporates a response generation system using user input, according to an embodiment.

The dialog system response generator under one or more embodiments can be incorporated into the development of a spoken dialog system that supports various functions and applications to allow users to interact with devices and receive services while performing other cognitively demanding, or primary tasks, such as driving or operating machinery. Such a dialog system can use commercially available or proprietary components for language applications. FIG. 1 is a block diagram of a spoken dialog system that incorporates a response generation system utilizing user input, according to an embodiment. For purposes of the present description, any of the processes executed on a processing device may also be referred to as modules or components, and may be standalone programs executed locally on a respective device computer, or they can be portions of a distributed client application run on one or more devices. The core components of system 100 include a spoken language understanding (SLU) module 104 with multiple understanding strategies for imperfect input, an information-state-update or other kind of dialog manager (DM) 106 that handles multiple dialog threads and mixed initiatives, a knowledge manager (KM) 110 that controls access to ontology-based domain knowledge, and a content optimizer 112 that connects the dialog manager and the knowledge manager for resolving ambiguities from the users' requests, regulating the amount of information to be presented to the user, as well as providing recommendations to users. In one embodiment, spoken user input 101 produces acoustic waves that are received by a speech recognition unit 102. The speech recognition unit 102 can include components to provide functions, such as dynamic grammars and class-based n-grams. In the case where the user input 101 is text-based rather than voice-based, the speech recognition unit 102 is bypassed, and simulated user input is provided directly to the spoken language understanding unit 104. A response generator 108 provides the output of the system 100. The response generator 108 generates audio and/or text output based on the user input. Such output can be an answer to a query, a request for clarification or further information, reiteration of the user input, or any other appropriate response. The response generator utilizes domain information when generating responses. Thus different wordings of saying the same thing to the user will often yield very different results.

Figure 2:
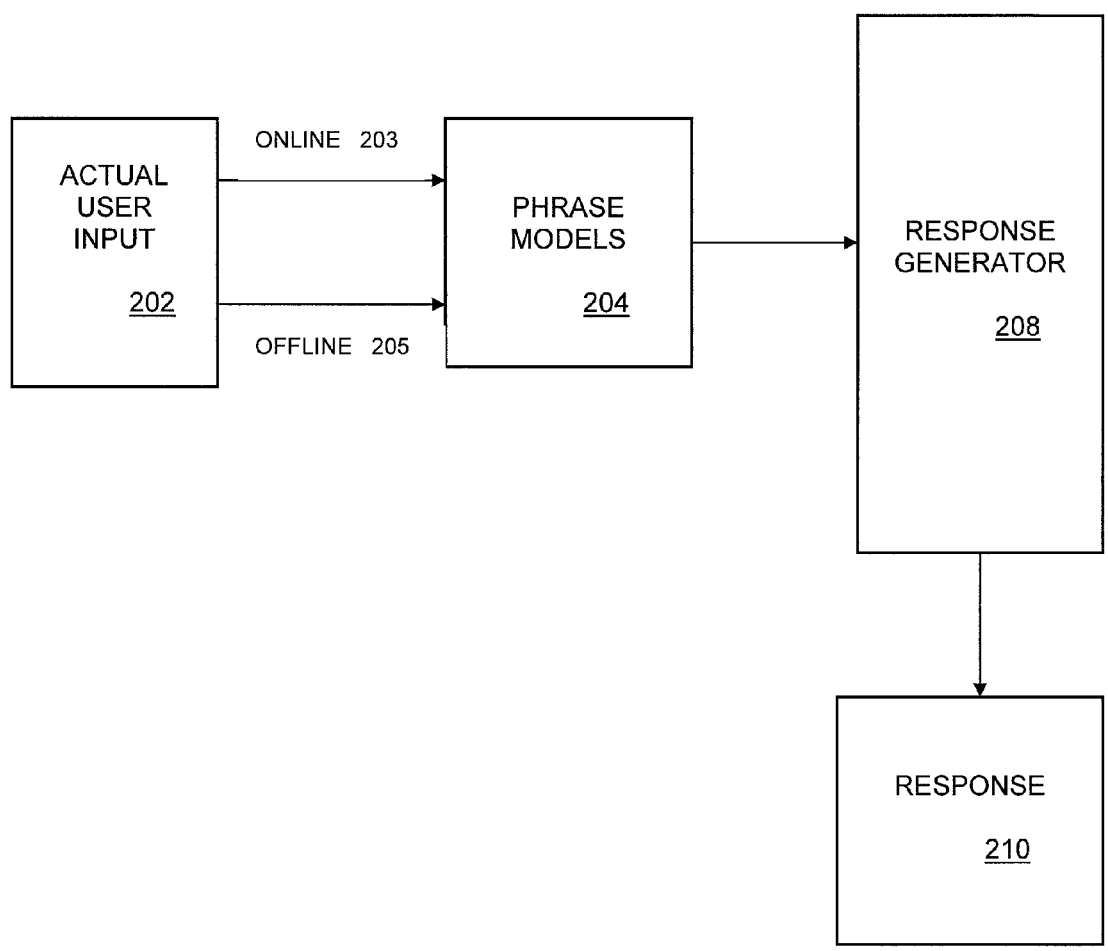
FIG. 2 is a block diagram of a response generator for spoken dialog systems that utilizes user input, under an embodiment.

In one embodiment, the dialog manager system 100 includes a subsystem that implements a training method based on actual user input in order to aid the response generator 108 to generate proper responses for the user. Such responses utilize wordings that the user himself or herself has used, and are therefore familiar to the user. The response generator for the dialog system implements two main functional phases, a training phase in which phrase models using actual user input are constructed for use by the response generator, and a response generation phase in which the dialog system output is generated and output to the user. The dialog system thus constructs phrase models based on actual user utterances. FIG. 2 is a block diagram of a response generator for spoken dialog systems that utilizes user input, under an embodiment. As shown in FIG. 2, the phrase models 204 are constructed from actual user input 202 during a training phase and are used by the response generator 208 to generate a response 210 during the response generation phase. In one embodiment, for the training phase, a spoken language understanding unit receives spoken input 202 from the users. The input can be any form of verbal communication that generates acoustic signals recognizable by the dialog system.

In one embodiment, the training phase generates phrase models at the semantic level. For this embodiment, system 100 of FIG. 1 uses a sequence of semantic frames as the basis for comparison. In general, a frame is a named set of structured slots, where the slots represent related pieces of information, and is a domain dependant selection. A frame may be used to describe semantic meanings such as speech acts, actions, and/or semantic constraints from the user. It may also be used by the system as an internal representation to communicate among different system modules, such as SLU 104, DM 106, and KM 110. In certain cases, each slot has an associated context-free grammar that specifies word string patterns that match the slot. In general, a slot structure consists of a slot name (slot_name) and corresponding value or another frame as its value (slot_value). For example, a user input may be a request for the system to locate a restaurant, such as, "I would like lunch in Palo Alto." This request has a number of constraints, such as time, action, and location. The slot structure for this utterance may be as follows:

Location: Palo Alto
Time: Lunch
Action: Find Restaurant
SpeechAct: Request/Command In one embodiment, the phrase models 204 that are used in generating system responses are derived by employing user utterances collected from various possible sources, such as previous interactions by the user with the system, or a WOZ (Wizard of Oz) experiment, and any information provided by other data sets. A WOZ experiment is an experimental evaluation mechanism that observes a user operating an apparently fully functioning system and supplements missing services through a hidden wizard that simulates the effect of a function.

The task of phrase model construction is accomplished through extracting phrases and phrase patterns from user utterances, generating new patterns based on the extracted ones, as well as selecting the best candidate based on different evaluation metrics. This problem is distinct from generating referring expressions, where the properties that identify the entity need to be determined. In the system of FIG. 2, the previous stages of the dialog system, such as shown in FIG. 1, have already decided on the properties that need to be verbalized, and a correct lexicalization of a phrase for these properties is needed in the system generation turn. The method selects system intended typical expressions from the user input, and also composes new responses for unseen cases by using parts from existing similar expressions and defined rules. The phrase level default rules cover the cases where the phrases for a constraint set have not been observed, while the sentence level default rules glue together the phrases for proper response.

The method is applicable for a number of human machine dialog systems, where the utterances from the users and the responses from the system are typically different, but some phrases from the user and the system turns could be shared. This is especially true for frame-based or plan-based domain-specific dialog systems. For example, if a person is asking for an entity with particular features/properties, an entity with the same or different properties needs to be expressed by the system in a later turn.

Figure 3:
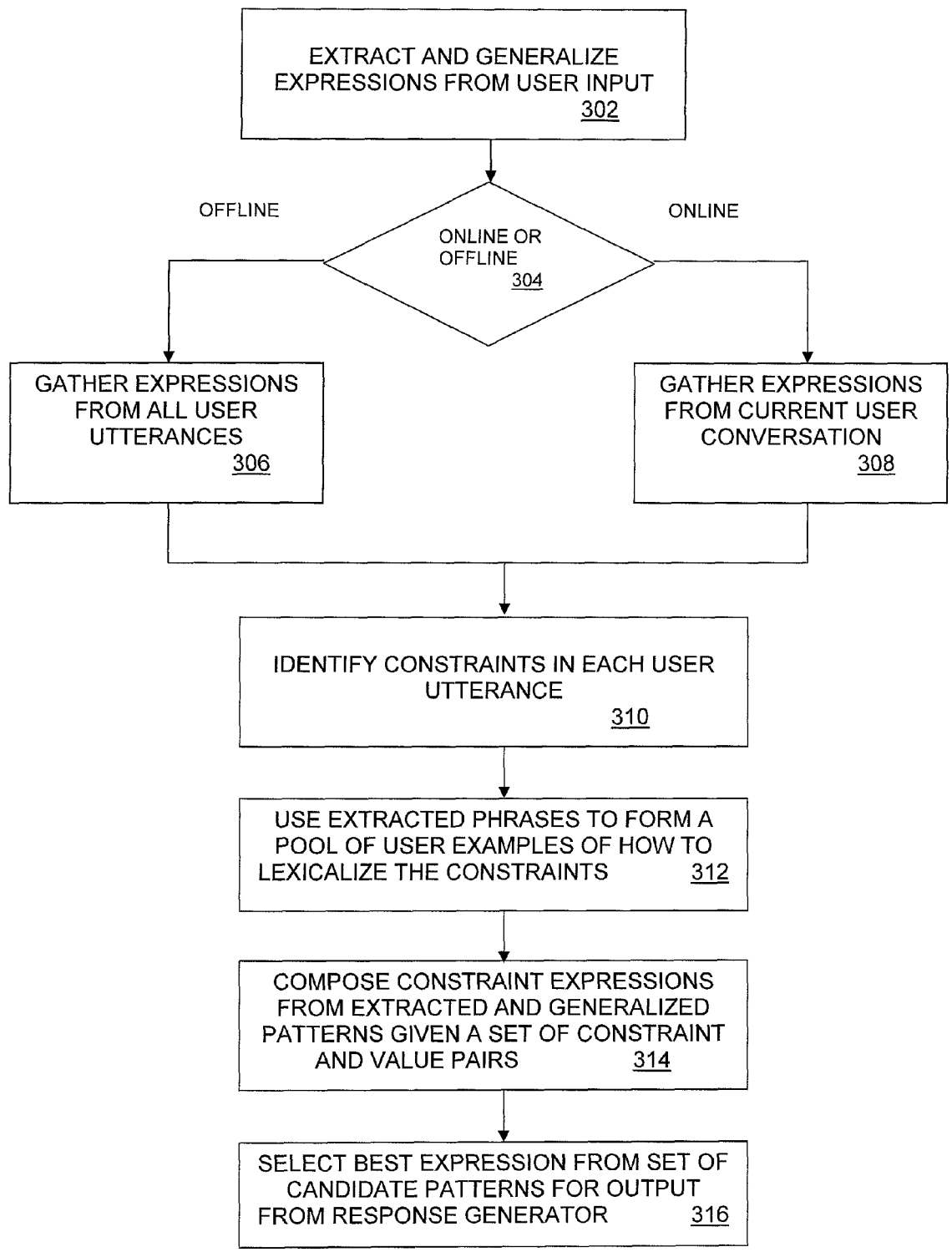
FIG. 3 is a flowchart that illustrates an overall method of generating responses in a dialog system using actual user input, under an embodiment.

FIG. 3 is a flowchart that illustrates an overall method of generating responses in a dialog system using actual user input, under an embodiment. This method relies on the fact that good expressions for a given constraint presumably already exist in previous conversations with the user or in collected data most of the time. This data is used to avoid the generation of bad expressions and alleviate problems caused by data sparseness. For the method illustrated in FIG. 3, current or past utterances from the user himself or herself are employed by the system to fashion appropriate responses to user queries or input to the system. In block 302, expressions are extracted and generalized from this user input. The input can either be obtained in an offline mode or an online mode, as determined in block 304. For the offline mode, all user utterances from any set of defined current or past conversations are collected, block 306; and for the online mode, user utterances from only the present conversation are collected, block 308. In both offline and online modes, a constraint identifier is used to determine which constraints are expressed in each user utterance, block 310. The extracted phrases are used to form a pool of user examples of how to lexicalize the constraints, block 312. The extracted phrases can be generalized into phrase patterns when the constraints are replaced by their semantic class names. For example, the original phrase "some Chinese food" can be generalized into the phrase pattern "some CuisineType food" by replacing "Chinese" with CuisineType.

The system constructs a response database that includes original phrase nodes, general phrase patterns and the results of the node operations. As shown in block 314, the system then composes constraint expressions from the extracted and generalized patterns given a set of constraint and value pairs. During the conversation, when a set of filled constraints are sent to the response generator, it will select one or more phrases from the database that best matches the given constraints. Thus, as shown in block 316, the system selects the best expression from set of candidate patterns for output from response generator. The task of composing constraint expressions from the extracted and generalized patterns given a set of constraint and value pairs depends generally on how many possible candidate patterns exist, and relies on certain defined selection criteria and back-off strategies. When a combination of constraints and values has been observed in the original corpus (possibly with a count over a certain threshold), the generation module can use that pattern. When a constraint pattern has been observed previously, but with different values, a generalization step will be performed. In this case the system attempts to find patterns that overlap as much as possible with the input, and constraints may be relaxed until such overlap is found. When a constraint combination has not been observed previously, the system attempts to use patterns created by composing existing or generated patterns. The composition may utilize any existing instances with one or more constraints. It may also decompose the patterns to create smaller units from the original expressions. When smaller units are available, the given constraint value pairs are clustered into subsets. The clustering operation can be learned from collected data, for example, the chunks in sentences that contain only the given constraints are considered during the clustering process. The optimal clustering or segmenting of a given set of constraint value pairs into subsets can be achieved through a search algorithm, such as a dynamic search algorithm with probability as a utility function. The proposed patterns can be ranked according to a language model to ensure alignment with the user utterance or variability of the system output.

Figure 4:
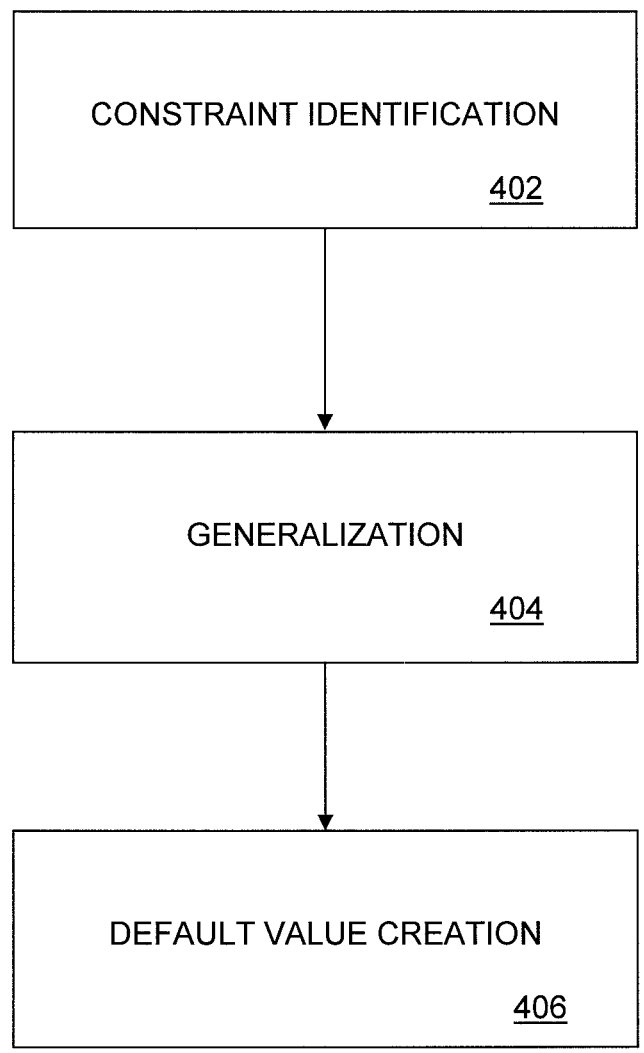
FIG. 4 is a flowchart that illustrates the main functional steps in the construction or the training of the phrase models, under an embodiment.

The general method of FIG. 3 comprises two main processing elements, a training phase and a response generation phase. FIG. 4 is a flowchart 400 that illustrates the functional steps in the construction or the training of the phrase models 204. In block 402, the system performs a constraint identification process in which it identifies the phrase expressions from the user utterances 202 that have constraints. The generalization block 404 generalizes the examples identified in block 402 through a decomposition process. The system then creates a default value, block 406, in which the system creates one or more default phrase expression for each semantic slot or slot subset.

The presence of a constraint identifier is a reasonable assumption, as the system should only generate information that it has internally understood. In most workable dialog systems, the spoken language understanding module will provide this functionality. The accuracy of the constraint identifier is typically high, allowing us to use its output to extract phrases that contain constraints.

The phrase models 204 can be constructed or trained before the system is started (offline mode) or while the conversation is happening (online mode). The former case may serve as a default model and the latter case may be used for live adaptation. These two training are illustrated in FIG. 2 as the offline mode 205 and the online mode 203.

In the offline mode 205, all user utterances available for training are collected. Two different approaches can then be used to further process these utterances. The first is a parse-tree-based approach, and the second is a chunking-based approach. In the parse-tree-based approach, all the utterances from the users are structurally annotated as parse-trees. The lowest level phrase nodes that contain user constraints or potentially useful phrases for the system responses can be identified. The automatic text chunking approach aims to determine non-overlapping phrase structures (chunks) in a given sentence. A chunk is a syntactic structure (e.g., a phrase) that groups several consecutive words together. There are two general phrase chunking tasks, including text chunking (shallow parsing), which finds chunks that perform partial analysis of the syntactic structure in text; and noun phrase chunking, which identifies the initial portions of non-recursive noun-phrases.

Examples of user constraints are the words "Chinese" and "tonight" in the example utterance "I want to have some Chinese food tonight," where "Chinese" indicates the cuisine type and "tonight" indicates the time. The lowest phrase node that contains the cuisine constraint is the noun phrase "some Chinese food" and the lowest phrase node that contains the time constraint is the word "tonight." Phrase nodes can contain one or more constraints. For phrase nodes that contain multiple constraints, general guidelines are used to decide which nodes should be extracted. Examples of such guidelines can include a rule that states that the constraint phrase nodes must be under the same non-S phrase node, and other similar rules. In some cases, a relative clause is used to express a constraint, for example, "a restaurant that serves Chinese food", and that node will be extracted accordingly. In the case where the spoken language understanding unit trains deep parsing models using annotated parse trees, the same annotated parse trees are used here for the phrase extraction in the constraint identification phase.

In the chunking-based approach, a shallow parser may be adopted for spoken language understanding. In this case, the user utterances are tagged by a POS (part of speech) tagger, chunked, or even parsed with a deep structure parser. Combining the chunker results with the constraints found by the constraint identifier, the phrase nodes that contain user constraints can be extracted. For generating the responses in dialog systems after content is decided, it is not necessary to have the user utterances completely parsed. This is because the constraints in user's expression that are relevant to the system responses mostly reside in the phrases or rather simple clauses in user's utterances. Such utterances can usually be modeled in a fairly straightforward manner. For example, the phrase "a nearby restaurant" in the user utterance "I want a nearby restaurant that serves Chinese food" is a simple phrase that has a distance constraint.

For both the parse-tree and chunking methods, extracted phrases form a pool of instances of lexicalized constraints. In one embodiment, these instances are then collected and stored in a database for use by the remaining processing blocks of FIG. 4.

In generalization block 404 of FIG. 4, the instances are further generalized into phrase patterns or templates. This is accomplished by replacing the constraints with their semantic class names. For example, the generalized phrase pattern "some CuisineType food" is generated by replacing "Chinese" with CuisineType in the original phrase "some Chinese food." The expressions in the instance pool may also get decomposed and re-combined to generate new pattern/phrase combinations by some node operations. The combination can be guided by a rule-based approach.

Another form of generalization, referred to as decomposition, can also be used. Generally decomposition is only applied when there are multiple constraints in a single sentence. For example, "I want to go to an expensive Chinese restaurant in Palo Alto" has three constraints. These are: priceLevel="expensive", cuisineType="Chinese", and cityName="Palo Alto". From this sentence, several different expressions can be obtained, such as "an expensive restaurant", "a Chinese restaurant", "a restaurant in Palo Alto", "a Chinese restaurant in Palo Alto", and so on. The phrase or node instances in the pool can also be re-composed to generate new pattern/phrase combinations by certain node operations based on their part of speech, syntactic categories, or probabilistic modeling. The combination can be guided by X-bar theory, meta-rules, or similar methods.

It is not always the case that every semantic constraint or constraint subset is covered by the collected data or by any rule-based approach. Any constraints that are not covered by either the generalization 404 or constraint identification 402 processes are handled by the default values created in the default value creation block 406 of FIG. 4. In this block, default expressions are designed for each semantic constraint if they are not already present in the database. In general, because of the limited number of semantic constraints, this effort is relatively minimal. Depending on system constraints and resources (e.g., memory and processing time), this phase may be extended to the cases of multi-constraint combination.

The above description covers the process of generating phrase models for all the semantic constraints through an offline procedure 205. In this manner, the system can construct a response database which includes the original phrase nodes, general phrase patterns and the results of node operations. During the conversation, when a set of filled constraints are sent to the response generator from the dialog manager, it will select phrase or phrases from the database that match the given constraints.

In the online mode 203, phrase models are generated during a conversation between the user and the dialog system. The system maintains a history of the conversation (including the processed utterances from the previous turns), and makes use of the understood content from the user's utterance in the current turn. If a deep parsing approach is used in the spoken language understanding module, a full parse can be recovered. In this case, an analogous procedure as described in the offline procedure can be used to extract the constraint phrases. The main difference here for the online mode is that the system may have to reply on the confidence scores of the constraint phrases to see whether they are usable. Computing the confidence scores for all the levels of a full parse tree is generally possible.

In the case where a shallow understanding approach is used in the dialog system, such as in a chunking-based approach, the system uses the extracted phrases for phrase generation. In this case as well, confidence scores need to be used for more reliable phrases.

During normal conversational interaction between user and system, the response in the current turn typically is targeted toward the most recent utterance from the user. Therefore, the constraints mentioned in the response should be mostly covered in the most recent turn or previous turns. In case of unavailable expressions for certain constraints, the system can use the responses built during the offline mode. The simplest case in the offline mode is the default expression. This is illustrated by way of the following example dialog:

USER: I want a five star restaurant that serves Chinese food.

SYSTEM: I did not find any five star restaurants that serve Chinese food, but I found 20 four star restaurants that serve Chinese food.

In this example, the first phrase ("any five star restaurants that serves Chinese food") can be constructed by using the user input, and the second expression ("four star restaurants that serve Chinese food") can be produced by generalization over the RatingLevel constraint.

Once the appropriate phrase models have been generated, using either the offline 205 or online 203 processes, the appropriate phrase or phrases are selected. During a typical conversation, there may be multiple phrase candidates for a given set of constraints. In this case, selection criteria and back-off strategies are utilized to select the best phrase for a given set of constraints. One method to select the best phrase is to use an example-based approach. In this method, when a set of constraints and values has a match in the database or model, possibly with a count exceeding a certain threshold, the response generator can use the associated phrases to construct a response sentence. When the given constraint set has been observed before, but with different values, a generalized pattern may be used. The system is configured to find patterns that overlap most with the input. For example, if the two given constraints are CuisineType:Indian and RatingLevel:5star and this combination has not been observed in the corpus, the system will try to relax each constraint by employing general patterns like: a CuisineType restaurant with five star rating, or an Indian restaurant with RatingLevel rating, and so on. Furthermore, general patterns which relax all the constraints will also be employed: such as, a CuisineType restaurant with RatingLevel rating, a RatingLevel restaurant that serves CuisineType food, and so on. In the last case, when the constraint set has not been observed before by itself or in a larger expression, the system attempts to use patterns created by combining the existing patterns. The proposed patterns can be ranked according to a language model to ensure alignment with the user utterance or variability of the system output. The training corpus and external sources might be used for deriving the language model.

In certain instances, the lexicalization of different constraints may depend on the particular constraint and on the values for that constraint. For example, the location constraint is best realized with a prepositional phrase. For example, "a restaurant in Lincoln," instead of "a Lincoln restaurant," even though the latter is a good pattern for most constraints. Similarly, depending on the value of the constraint, different patterns are often preferred. For example, if the CuisineType is "Barbeque," the system should select a realization different than the one for CuisineType is "Chinese." In this case, the response "a restaurant that serves Chinese food" is a good response, but the response "a restaurant that serves Barbeque food" is not a very fluent form.

Once the appropriate phrase or phrases have been selected the response generator constructs the response sentences using the selected phrases. Typically, when a set of constraints, an action, and a speech act are given by the dialog manager, a surface generator needs to generate one or more sentences to convey the intended message. If more than one sentence is needed, one additional step is used to split the set of constraints into desired subsets based on observed data. In one embodiment, this process is separated into two stages: the training stage and the application stage.

During the training stage, in the simple cases, each sentence indexed by the triple: its speech act, action, and constraint set. When a sentence is a coordinate sentence that has more than one speech act or main action, it is indexed by multiple triples. The sentence is further split into the clauses with the arguments instantiated. This would extend the coverage for response generation.

Similar to the phrase model construction, a generalization step is performed to obtain sentence templates as a back-off model. This would enable the possibility that different units in a sentence template may come from different sources (phrases or sentences). Sentences for all the triples with a speech act, an action, and a singleton constraint set are manually created if they have not been observed already in the training data, either from the user side or the WOZ side. Likewise, these are indexed by the triples.

Figure 5:
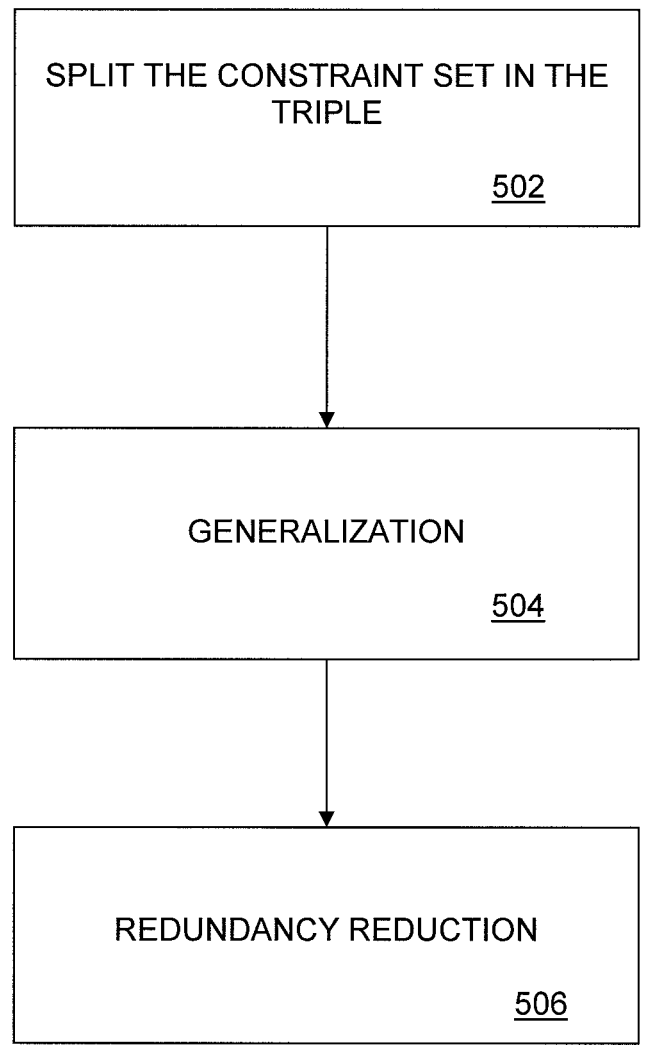
FIG. 5 is a flowchart that illustrates the main functional steps in a sentence generation process, under an embodiment.

After the training stage, an application stage is employed to complete the sentence generation. FIG. 5 is a flowchart that illustrates the main functional steps in a sentence generation process, under an embodiment. In block 502, if the given triple has not been observed in the data (indexed in the model), the constraint set in the triple is split into smaller subsets, each of which is in the model. The criteria for optimal split include the minimum number of subsets, preferred ordering of the subsets to match with the existing model. A sequence of triples is returned after the split step 502.

Block 504 is a generation step in which, for each triple in the sequence, from the first to the last, the system generates the corresponding sentence based on the trained model.

The generation step is followed by a redundancy reduction step 506. In this step, the system proceeds through the generated sentences from the first to the last, and if a noun phrase used in the current sentence is also used in the previous sentence and they refer to the same entity, the current noun phrase is replaced by a pronoun with the same number, person, and gender. Typically, no more than one noun phrase with the same number, person, and gender can be replaced in a sentence to avoid any possible confusion. For the same reason, it is not desired to have more than two pronouns in a sentence or in an utterance. Two consecutive sentences sharing the same speech act and action may also be reduced to a single sentence with the speech act and action if only one argument of the two sentences differs.

Embodiments described above primarily utilize expressions that contain constraints in order to realize efficiencies based on the more frequent tasks performed in real dialog systems. However, other expression aspects can also be considered. For example, expressions with rhetorical or discourse aspects of the dialog can also be processed through a response generator system, as described above. In this case, one or more certain components of the phrase may be identified and labeled with appropriate information regarding what type of component or aspect it is, such as rhetorical or discourse. These components can then be subject to a training process so that default values can be formed, in a method analogous to the constraint-value process, shown in FIG. 4. In this manner, user provided aspects of speech can be used to inform responses provided by a dialog system that may utilize such aspects in a response generator module.

The response generator utilizing user input represents a systematic way to extract phrases and phrase patterns from user's utterances and to generalize over these patterns for composing sentences in generating the dialog system responses. Such a system generally provides more natural and aligned responses, which alleviates the total cognitive load imposed on the user, especially when they are performing a primary task such as driving. This approach can also save a significant amount of effort in developing and designing system responses, as it does not require additional data annotation or development of rules.

Aspects of the response generation process described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: microcontrollers with memory (such as EEPROM), embedded microprocessors, firmware, software, etc. Furthermore, aspects of the content serving method may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the response generation process is not intended to be exhaustive or to limit the embodiments to the precise form or instructions disclosed. While specific embodiments of, and examples for, processes in computing devices are described herein for illustrative purposes, various equivalent modifications are possible within the scope of the disclosed methods and structures, as those skilled in the relevant art will recognize. The elements and acts of the various embodiments described above can be combined to provide further embodiments. These and other changes can be made to the response generation process in light of the above detailed description.

In general, in the following claims, the terms used should not be construed to limit the disclosed method to the specific embodiments disclosed in the specification and the claims, but should be construed to include all operations or processes that operate under the claims. Accordingly, the disclosed structures and methods are not limited by the disclosure, but instead the scope of the recited method is to be determined entirely by the claims.

While certain aspects of the disclosed system and method are presented below in certain claim forms, the inventors contemplate the various aspects of the methodology in any number of claim forms. For example, while only one aspect may be recited as embodied in machine-readable medium, other aspects may likewise be embodied in machine-readable medium. Accordingly, the inventors reserve the right to add additional claims after filing the application to pursue such additional claim forms for other aspects.

What is claimed is:

1. A method of generating responses in a dialog system in response to user input in a current conversation session, comprising:
    collecting original user phrase data comprising the user input from one or more past conversation sessions between a first user only and the dialog system to form phrase models in a training phase using the first user's own phrases for use by a response generator in response to a query by the first user;
    using the phrase models at a semantic level to use wordings in the response that utilize the first user's own phrases and to identify constraint-carrying phrases from the first user's utterances;
    determining constraints expressed in each user utterance in the past conversation sessions using one or more constraint identifiers;
    forming a pool of user examples instructing the system on how to lexicalize the constraints to form lexicalized constraints;
    extracting one or more extracted constraints, each comprising a constraint-value pair, from the user input;
    generalizing the extracted constraints into phrase patterns using the lexicalized constraints to produce general phrase patterns;
    constructing a response database consisting of the original phrase data and the general phrase patterns;
    transmitting a set of filled constraints to the response generator component from the user input; and
    selecting at least one phrase from the response database that optimally matches the set of filled constraints to form a response utilizing the first user's own phrases.

2. The method of claim 1 wherein the one or more conversation sessions comprises a series of conversation turns, and wherein selecting the at least one phrase from the response database comprises using a most recent utterance from the first user.

3. The method of claim 2 further comprising:
    utilizing a chunking-based approach to extract phrases used by the first user in a constraint specification; and
    updating the extracted phrases with values retrieved from the response database.

4. The method of claim 1 wherein the one or more conversation sessions comprises at least one previous session between the first user and the dialog system, and not including the current session user input.

5. The method of claim 4 further comprising:
    utilizing one of a parse-tree based approach or a chunking-based approach to extract phrases used by the first user in a constraint specification and form a pool of examples of how to lexicalize constraints in the user input; and
    generalizing the constraints into phrase patterns by replacing constraints with corresponding semantic class names.

6. The method of claim 5 wherein the parse-tree based approach structurally annotates all user utterances as parse-trees.

7. The method of claim 5 wherein the chunking-based approach tags all first user utterances using a part-of-speech tagger, and parsed by one of a shallow parser or deep structure parser.

8. The method of claim 1 further comprising:
    determining whether or not the constraint and value pairs of the filled constraints are present in the response database; and
    configuring the response generator to use the corresponding phrase in the response database if the constraint and value pairs of the filled constraints are present in the response database.

9. The method of claim 1 further comprising:
    determining whether or not the constraint and value pairs of the filled constraints are present in the response database; and
    configuring the response generator to use a corresponding phrase in the response database that overlaps the user input constraint and value pairs of the filled constraints to as high a degree if possible, if the values of the constraints are different between the filled constraints of the database and the values of the constraints in the user input.

10. The method of claim 1 further comprising:
determining whether or not the constraint and value pairs of the filled constraints are present in the response database; and
creating constraint patterns from existing or generated patterns if the constraint and value pairs of the filled constraints are not present in the response database.

11. The method of claim 1 further comprising:
indexing, in the training phase, each sentence in the past conversation sessions by a speech act, action, and constraint-set triple; and
performing a generalization process to obtain sentence templates as a back-off model to enable processing of units in a sentence that come from either a phrase or a sentence uttered by the first user, wherein the generalization process identifies constraint-sets present in the past conversation sessions but having different values, and wherein the back-off model utilizes the lexicalized constraints to align system variability due to the different values, with the original phrase data.

12. A method of generating phrases in a dialog system in response to user input during one or more turns of a present conversation session between a first user and the dialog system, comprising:
collecting, during a training phase, a corpus of user data from one or more past conversation sessions between the first user only and the dialog system to form phrase models using the first user's own phrases for use by a response generator component in response to a query by the first user;
determining constraints expressed in each user utterance in the past conversation sessions using one or more constraint identifiers;
forming a pool of user examples instructing the system on how to lexicalize the constraints to form lexicalized constraints;
using the phrase models at a semantic level to use wordings in the response that utilize the first user's own phrases;
constructing phrase models based on the corpus of first user data, wherein the phrase models comprise constraint sets consisting of constraint-value pairs based on the lexicalized constraints;
selecting an optimal constraint set from the corpus of user data in response to a constraint within the user input; and
generating a sentence for output from the response generator component incorporating the optimal constraint set to form a response utilizing the first user's own phrases.

13. The method of claim 12 wherein the step of constructing phrase models further comprises:
identifying phrase expressions from the first user utterances that have constraints;
generalizing identified constraints through a decomposition process; and
creating one or more default phrase expressions for each constraint set.

14. The method of claim 12 wherein the step of selecting an optimal constraint set further comprises:
determining whether or not the constraint and value pairs of the filled constraints are present in the response database;
configuring the response generator component to use the corresponding phrase in the response database if the constraint and value pairs of the filled constraints are present in the response database;
configuring the response generator component to use a corresponding phrase in the response database that overlaps the user input constraint and value pairs of the filled constraints to as high a degree if possible, if the values of the constraints are different between the filled constraints of the database and the values of the constraints in the user input; and
creating constraint patterns from existing or generated patterns if the constraint and value pairs of the filled constraints are not present in the response database.

15. The method of claim 12 wherein the user input comprises one or more sentences, each sentence consisting of a triple comprising a speech act, an action, and a constraint set, and wherein the step of generating a sentence for output from a response generator component further comprises:
indexing each sentence of the user input into a corresponding triple;
splitting the constraint set of the triple into a plurality of smaller subsets if the triple is not present in the corpus;
generating a sequence of triples from the split step;
generate a corresponding sentence for each triple of the sequence of triples based on a defined training model; and
reducing redundancies in the generated corresponding sentences.

16. The method of claim 15 wherein the step of reducing redundancies further comprises:
determining if a noun phrase used in a current sentence is also used in a previous sentence and refers to an identical entity; and
replacing the current noun phrase with a pronoun with the same number, person, and gender if the noun phrase is used in the previous sentence.

17. The method of claim 12 further comprising performing a generalization process to obtain sentence templates as a back-off model to enable processing of units in a sentence that come from either a phrase or a sentence uttered by the first user; wherein the generalization process identifies constraint-sets present in the past conversation sessions but having different values, and wherein the back-off model utilizes the lexicalized constraints to align system variability due to the different values, with the original phrase data.

18. The method of claim 17 further comprising:
utilizing a chunking-based approach to extract phrases used by the first user in a constraint specification; and
updating the extracted phrases with values retrieved from the response database.

19. The method of claim 12 wherein the corpus of user data from one or more conversation sessions comprising at least one previous session not including the current session user input.

20. The method of claim 19 further comprising:
utilizing one of a parse-tree based approach or a chunking-based approach to extract phrases used by the first user in a constraint specification and form a pool of examples of how to lexicalize constraints in the user input; and
generalizing the constraints into phrase patterns by replacing constraints with corresponding semantic class names.

21. The method of claim 20 wherein the parse-tree based approach structurally annotates all user utterances as parse-trees.

22. The method of claim 20 wherein the chunking-based approach tags all user utterances using a part-of-speech tagger, and parsed by one of a shallow parser or deep structure parser.

* * * * *